Jan. 24, 1950

W. H. WORTHINGTON
WATER COOLING CYLINDER HEAD
AND JACKET CONSTRUCTION 2,495,401

Filed Dec. 29, 1945

3 Sheets-Sheet 1

*INVENTOR.*
WAYNE H. WORTHINGTON

*ATTORNEYS.*

Patented Jan. 24, 1950

2,495,401

UNITED STATES PATENT OFFICE 2,495,401

WATER COOLING CYLINDER HEAD AND JACKET CONSTRUCTION

Wayne H. Worthington, Waterloo, Iowa, assignor to Deere Manufacturing Co., a corporation of Iowa Application December 29, 1945, Serial No. 637,823

22 Claims. (Cl. 123—173)

The present invention relates generally to internal combustion engines and more particularly to auxiliary engines adapted for use in starting larger engines of the compression ignition or Diesel type. It is well known to those skilled in the art that starting engines of this type are frequently provided with means for transferring heat from the exhaust gases of the starting engine to the water in the jackets of the main Diesel engine, to aid in warming up the latter and thus expediting the starting thereof.

The principal object of the present invention relates to the provision of a novel and improved heat transfer device, which is simpler and less expensive in construction but more efficient in operation than structures of this class heretofore known to those skilled in the art.

In the accomplishment of this object, the exhaust gases from the starting engine are conducted through an exhaust passage which extends peripherally around the starting engine cylinder or bank of cylinders as the case may be. The exhaust duct extends through the water jacket of the starting engine cylinder or through a water jacket which is connected in the circulatory system, thus providing for transfer of heat to the cooling water system of the starting engine, which in turn is connected in series with the circulatory system of the main Diesel engine.

A related object has to do with the provision of exhaust duct and water passages in the starting motor cylinder block, which are interconnected by exhaust and water passages in a pair of side castings adapted to be secured on opposite sides, respectively, of the cylinder block, thus providing for simplicity in the casting structure.

Another feature of the present invention relates to the division of the water jacketing system into two sections, so that the water passes directly from the main Diesel engine water jacket through one of the sections of the starting motor water jacket to a water pump which discharges into the other section of the starting motor water jacket and from there directly returned to the Diesel engine jacket.

Another feature resides in arranging the exhaust duct and water passages to obtain maximum heat transfer efficiency, by generally directing the hottest exhaust gases into heat transfer relation with the warmest water, while the cooler gases are passed through the coolest portion of the water circulatory system.

Figure 1:
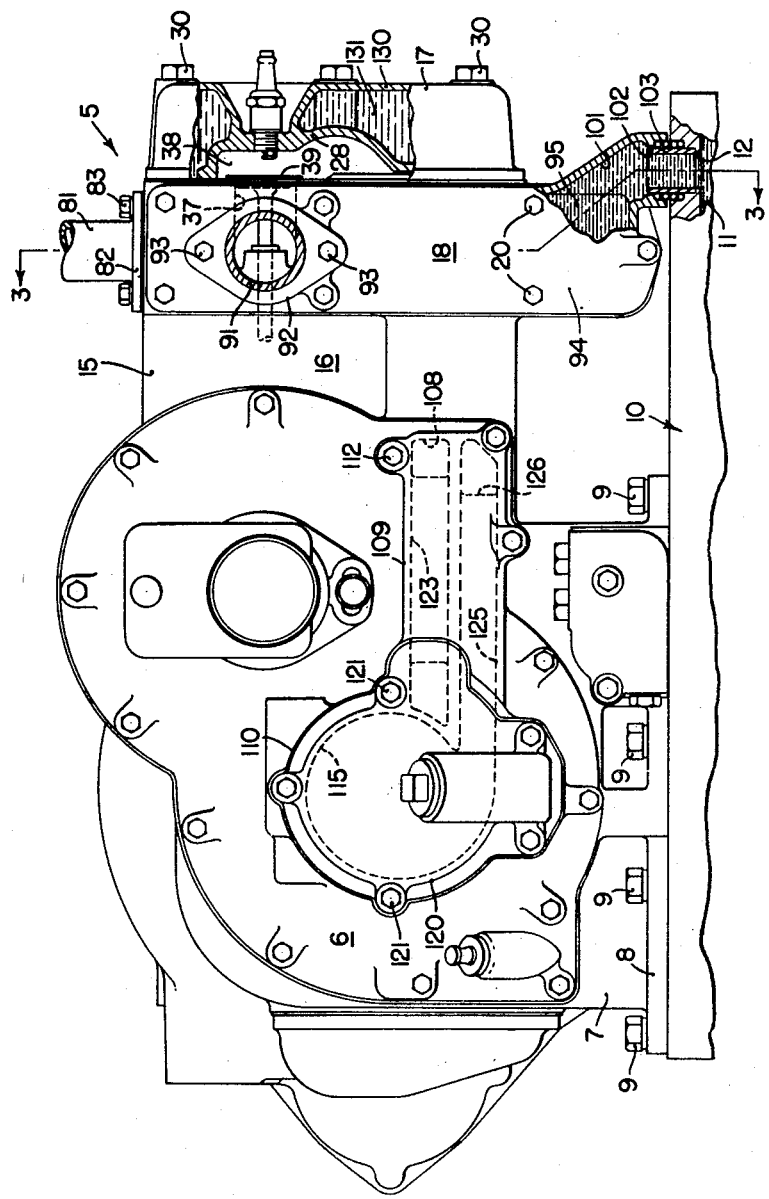
Figure 2:
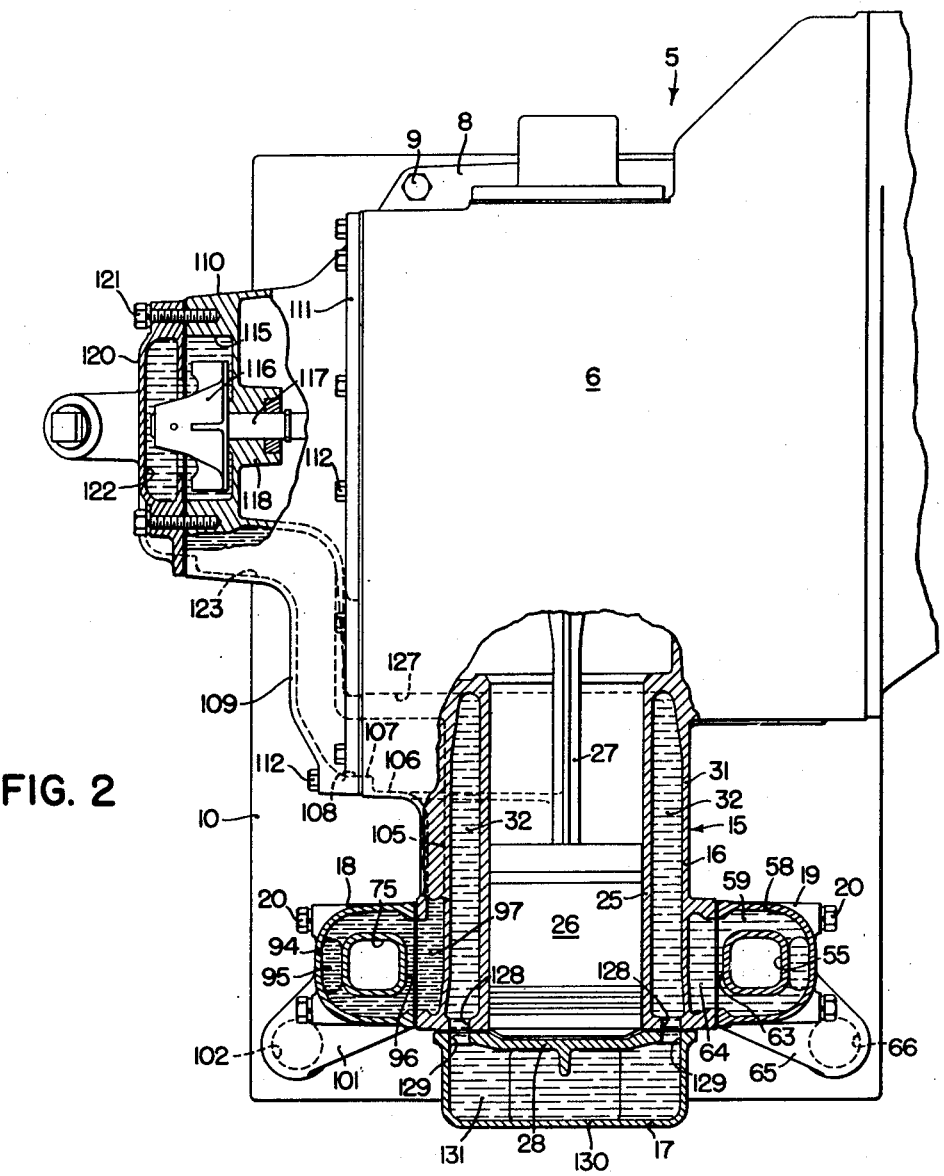
Figure 3:
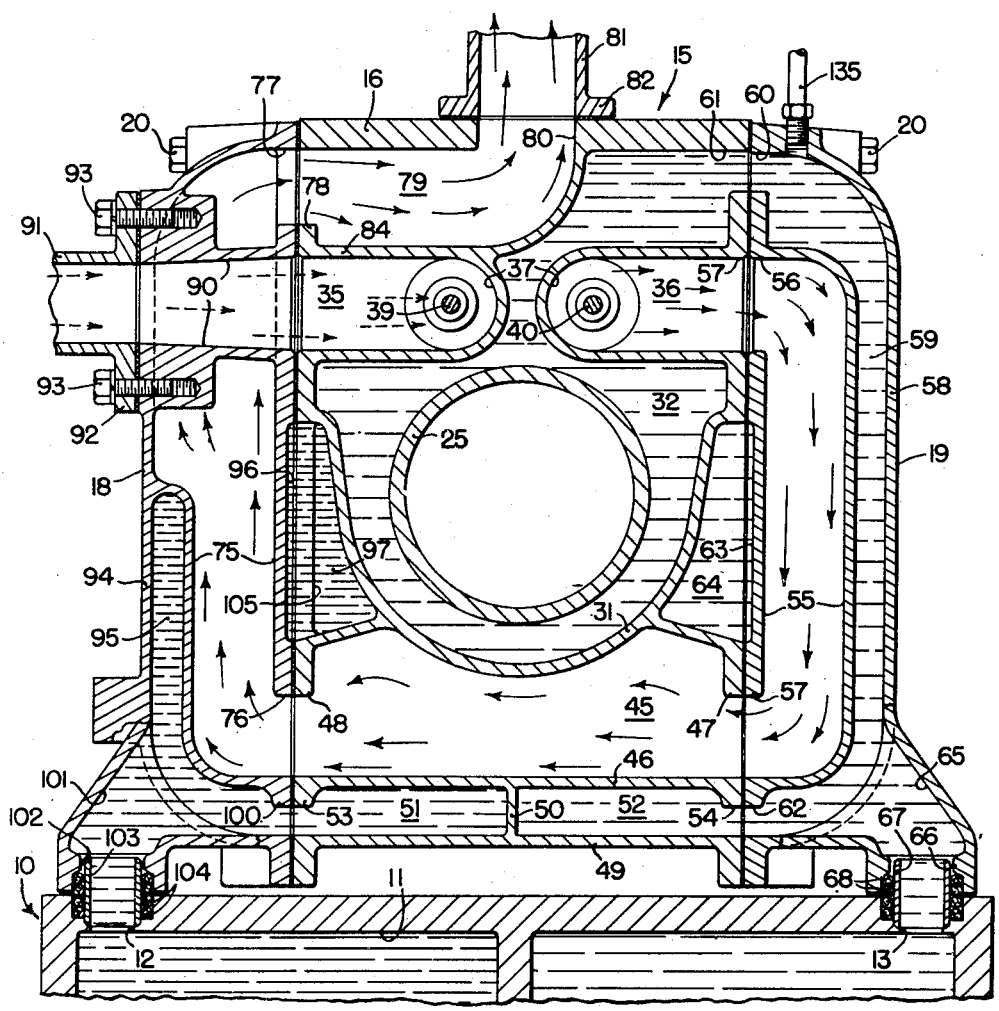

These and other objects and advantages of the present invention will be apparent to those skilled in the art after a consideration of the following description, in which reference is made to the drawings appended hereto, in which Figure 1 is a side elevational view of an auxiliary starting engine mounted on a main Diesel engine, portions of the water jacketing being broken away to show the details of construction;

Figure 2 is a top plan view of the auxiliary starting engine, with portions broken away to expose certain parts of the circulatory system; and Figure 3 is an enlarged sectional elevational view taken along a line 3—3 in Figure 1.

Referring now to the drawings, the auxiliary starting engine is indicated in its entirety by reference numeral 5 and is of the single cylinder, horizontal type. The engine 5 comprises generally a crank case 6 mounted on a supporting base 7 which has a horizontal mounting flange 8, rigidly secured by bolts 9 to the main compression-ignition or Diesel engine, indicated generally by reference numeral 10. No details of the Diesel engine are considered necessary to the present disclosure, except that it is provided with a water jacket 11 provided with a pair of openings 12, 13 at widely spaced points in the circulatory system of the main Diesel engine. The single cylinder of the starting engine 5 is indicated at 15, and comprises a main cylinder block casting 16 supported rigidly on the crank case 6 and extending horizontally therefrom, a cylinder head casting 17, and a pair of generally vertically disposed side castings 18, 19, rigidly secured at opposite sides of the cylinder block casting, respectively, by bolts 20.

The cylinder block casting 16 includes a cylinder wall 25, within which is slidably disposed a piston 26 having a connecting rod 27 suitably connected to the crank shaft (not shown) on the engine 5, which is adapted to be coupled to the main Diesel engine for starting purposes, as is well known to those skilled in the art.

The end of the cylinder 25 is closed by means of a head wall 28 in the cylinder head casting 17, the latter being secured to the end of the cylinder block 16 by suitable bolts 30.

A water jacket wall 31 spaced outwardly from the cylinder wall 25 defines therebetween a space 32 adapted to be filled with water or other cooling medium, which comprises a water jacket which envelops the cylinder wall 25 and absorbs the heat of combustion from the latter.

The block casting 16 is provided with an inlet duct 35 and an outlet duct 36, which extend inwardly from the sides of the block casting 16, respectively, and have inner ends which turn forwardly, as indicated at 37, and communicate with the combustion chamber 38 in the cylinder head casting 17 through ports which are controlled by inlet and outlet valves 39, 40, respectively, in the usual manner.

The block casting 16 is provided with a transversely extending exhaust passage 45 in its lower portion, diametrically opposite from the inlet and exhaust ports 35, 36, between the lower side of the jacket wall 31 and a passage wall 46 spaced beneath the latter. The exhaust passage 45 has inlet and exhaust openings 47, 48 at opposite sides of the block casting 16, respectively. A bottom wall 49 is spaced beneath the passage wall 46 and the two walls 46, 49 are interconnected by a dividing wall 50 to form a pair of separate water jackets 51, 52 enclosing the lower portion of the exhaust passage 45, and the water jackets 51, 52 have openings 53, 54 on opposite sides of the block casting 16, respectively.

The side casting 19 includes a vertically extending U-shaped exhaust conduit 55, the upper end of which terminates in an opening 56 which registers with an opening 57 of the exhaust duct 36 for conducting exhaust gases downwardly therefrom, and the lower end of the exhaust conduit 55 has an opening 57 which registers with the opening 47 of the exhaust passage 45. An outer wall 58 is spaced from the exhaust conduit 55 to define a water jacket space 59 therebetween, enveloping the exhaust conduit 55 to absorb heat therefrom. The upper end of the water jacket 59 is provided with an opening 60 which registers with an opening 61 in the cylinder block 16 to connect the water jacket 59 with the cylinder jacket 32 at the top of the cylinder block 16. The lower end of the water jacket 59 in the casting 19 is provided with an opening 62 which registers with the opening 54 in the lower water jacket section 52 in the block casting 16. The inner side of the casting 19 intermediate the ends of the conduit 55 is open at 63 to register with a recess 64 in the cylinder block casting 16 to provide a continuous water jacket space around the exhaust conduit 55 between the latter and the jacket wall 31. The lower end of the water jacket 59 is provided with a downwardly extending passage 65 having a bottom opening 66 adapted to register with one of the openings 13 in the main Diesel engine water jacket 11, with the two openings 66 and 13 being connected by a tubular connector 67, around which is disposed a plurality of annular sealing members 68 between the connector 67 and the walls of the openings 13, 66 to prevent leakage therefrom.

The opposite side casting 18 is provided with a generally U-shaped vertically extending exhaust continuation duct 75, having an opening 76 at its lower end disposed in register with the opening 48 at the end of the exhaust passage 45, to receive exhaust gases therefrom and conduct them upwardly through the casting 18. The upper end of the continuation duct 75 is provided with an opening 77 which registers with an opening 78 in an exhaust discharge duct 79, which is formed in the top of the cylinder block casting 16 and has an upwardly extending discharge opening 80 at the top of the casting 16. An exhaust pipe 81 is provided with a radially extending flange 82 which is secured to the block casting 16 by bolts 83.

It will be noted that the exhaust discharge duct 79 and the intake duct 35 are separated by a common wall 84, through which some heat can be transmitted from the exhaust gases to the fuel mixture in the intake duct 35. The intake duct 35 registers with a short intake passage 90 formed integrally with the side casting 18 and extending through the vertical exhaust continuation duct 75, thereby permitting heat to be transferred to the fuel mixture which passes through the intake passage 90 to the intake duct 35. The fuel mixture is conducted to the passage 90 by means of an intake pipe 91 having a radially extending flange 92 which is bolted to the outer side of the side casting 18 by bolts 93.

The lower portion of the side casting 18 is provided with an outer jacket wall 94 spaced from the continuation duct 75 to define a water jacket space 95. The inner side of the water jacket 95 is open at 96 with a recess 97 in the side of the block casting 16, thereby providing a continuous water space 95, 97 which envelops the vertical continuation duct 75. The lower end of the water jacket 95 is provided with an opening 100, which registers with the opening 53 in the water jacket section 51 of the block casting 16. The lower end of the side casting 18 is also provided with a downwardly extending passage 101 provided with an opening 102 in the bottom thereof, which registers with the opening 12 in the water jacket 11 of the Diesel engine. The openings 12, 102 are interconnected by a tubular connector 103 provided with a plurality of annular sealing devices 104 between the tubular connector 103 and the walls of the registering openings 12, 102, to prevent leakage.

The recess 97 connects with a passageway 105 which extends axially along the cylinder block casting 16 toward the crank case 6, and terminates in a chamber 106, which opens at one side of the block casting, the opening being designated by reference numeral 107. The opening 107 registers with an opening 108 in an extension 109 of a water pump casting 110, the latter being provided with a mounting flange 111 secured by bolts 112 to the side of the crank case 6. The water pump casting 110 is provided with a pump chamber 115 in which is disposed a rotatable pump rotor 116 mounted on a shaft 117 that is journaled in a bearing 118, the shaft 117 being a continuation of the crank shaft of the engine. An intake housing 120 is secured by bolts 121 to the pump casting 110 and has an intake chamber 122, through which water passes to the pump chamber 115. An intake passage 123 connects with the intake chamber 122 and extends forwardly through the extension 109 to the opening 108 in the main block casting 16. A pump discharge passage 125 extends forwardly from the pump chamber 115 through the extension 109 of the casting 110 and terminates at an opening 126 in register with an inlet passage 127 in the cylinder block casting 16, that communicates with the inner end of the cylinder water jacket 32.

The outer end of the cylinder jacket 32 is provided with a plurality of circumferentially spaced openings 128 which register with similar openings 129 in the cylinder head casting 17, the latter being provided with an outer wall 130 spaced from the head wall 28 to provide a water jacket space 131.

Thus, there are two separate water jackets connected to opposite sides of the water pump, respectively. The jacket section 51 in the main block casting 16 and the water jacket 95 in the side casting 18 constitute one of the water jackets, which connects through the passage 105 to the intake duct 123 of the water pump 110. The discharge duct 125 from the pump is connected through the passage 127 with the axially extending cylinder water jacket 32, the cylinder head water jacket 131, the exhaust conduit water jacket 59 in the side casting 19, and the lower jacket section 52 in the main block casting 16.

During operation of the starting engine 5, the water pump draws water from the water jacket 11 of the main Diesel engine through the connection 103, the passage 101, the jacket 95, recess 97, passage 105, chamber 106, pump intake duct 123, and intake chamber 122, and discharges the water through the discharge duct 125, passage 127, cylinder jacket 32, past the exhaust duct 36, through the registering openings 61, 60, down through the exhaust conduit water jacket 59, the discharge passage 65, and the connection 67 to the water jacket 11 of the main Diesel engine. Thus, by forcing the heated water from the starting engine into the Diesel engine water jacket 11 and drawing cold water from the latter to be heated in the auxiliary engine, the Diesel engine is rapidly warmed up to the point at which it will run under its own power, while the starting engine is turning the Diesel engine to establish circulation of lubricating oil.

It will be noted that the cold water from the intake connection 103 is directed to the cooler portions of the exhaust duct, while the warm water is forced into the Diesel engine near the hottest gases in the exhaust duct, thereby conforming with the counter-flow principle of efficient transfer of heat.

A vent pipe 135 is connected to the upper end of the water jacket 59 in the side casting 19 to relieve any steam pressure that may develop in the circulatory system. Preferably, the vent pipe 135 is connected to the top of the Diesel engine cooling radiator (not shown).

It is to be understood that the present invention is not limited to the particular details shown and described herein, except as defined in the claims which follow.

I claim:
1. In an internal combustion engine comprising cylinder means, one end of which is closed to provide space for combustion and exhaust valve means on one side of said cylinder means communicating with said combustion space, an exhaust duct leading from said exhaust valve means and extending peripherally around said cylinder means adjacent said combustion space and spaced therefrom, and water jacket means enclosing said exhaust duct and disposed between the latter and said cylinder means.

2. In an internal combustion engine comprising a cylinder, one end of which is closed to provide a combustion chamber and having a water jacket surrounding the same, an exhaust duct for said cylinder extending peripherally around at least a portion thereof adjacent said chamber, and a water jacket enclosing said duct and connected with said cylinder water jacket.

3. In an internal combustion engine comprising a cylinder, one end of which is closed to provide space for combustion, and a water jacket wall spaced therefrom to hold water in contact therewith, there being an exhaust passage for said cylinder extending peripherally around at least a portion of said chamber, said water jacket wall serving as a common partition between the water jacket and the exhaust passage, and an outer water jacket on said exhaust passage and connected with said cylinder water jacket.

4. In an internal combustion engine comprising cylinder means, one end of which is closed to provide space for combustion and exhaust valve means on one side of said cylinder means for controlling flow of exhaust gases from said space, a water jacket surrounding said cylinder means and including a wall spaced from said cylinder means to hold water therebetween, there being an exhaust passage extending peripherally completely around said cylinder means adjacent said combustion space and having a discharge end on said one side of said cylinder means, said water jacket wall serving as a common partition between said passage and said water jacket, and an outer water jacket enclosing said exhaust passage and having a water connection with said cylinder water jacket.

5. For use with a main compression ignition engine, a starting engine comprising a cylinder wall having a water jacket surrounding the same, an exhaust duct for said cylinder extending peripherally around at least a portion thereof in contact with said water jacket for transferring heat thereto, a water jacket enclosing said duct and connected with said cylinder water jacket, and a pair of inlet and outlet connections for said water jacket adapted for connection to the main engine for warming the latter.

6. For use with a main compression ignition engine, a starting engine comprising cylinder means and exhaust valve means on one side of said cylinder means, a water jacket surrounding said cylinder means and including a wall spaced from said cylinder means to hold water therebetween, there being an exhaust passage extending peripherally completely around said cylinder means and having a discharge end on said one side of said cylinder means, said water jacket wall serving as a common partition between said passage and said water jacket, an outer water jacket enclosing said exhaust passage and having a water connection with said cylinder jacket, and a pair of inlet and outlet connections for said connected jackets adapted for connection to the water jacket of said main engine for circulating water therethrough that has been warmed by heat from said starting engine.

7. In an internal combustion engine comprising a cylinder having a water jacket surrounding the same, an exhaust duct for said cylinder extending peripherally around at least a portion thereof, and a water jacket enclosing said duct and connected with said cylinder water jacket, said duct enclosing jacket having an inlet connection and an outlet connection, and said cylinder jacket having an inlet connection and an outlet connection, and a water pump connected between said duct jacket outlet connection and said cylinder jacket inlet connection.

8. In an internal combustion engine comprising a crank case, a crank shaft therein, and a cylinder mounted thereon, said cylinder having an enveloping water jacket, a water pump driven by said crank shaft and having its discharge connected with said water jacket, an exhaust duct having a portion extending through said water jacket, a second portion of said exhaust duct having a water jacket separated from said cylinder jacket and extending axially along said cylinder jacket toward said crank case outside of said cylinder jacket and connected to the intake of said pump.

9. For use with a main compression ignition engine, a starting engine comprising a cylinder having an enveloping water jacket, a water pump having inlet and discharge connections, one of said connections communicating with said water jacket, an exhaust duct having a portion extending through said water jacket, a second portion of said duct having a separate water jacket communicating with the other of said pump connections, and a pair of inlet and outlet connections associated with said water jackets, respectively, for connecting the latter with the jacket of said main engine.

10. For use with a main compression ignition engine, a starting engine comprising a crank case and a cylinder mounted thereon, said cylinder having valve means on one side thereof and an enveloping water jacket, a water pump having inlet and discharge connections, said discharge connection communicating with said water jacket, an exhaust duct extending from said valve means and peripherally encircling said cylinder, a portion of said duct adjacent said valve means having a water jacket communicating with said cylinder jacket, another portion of said duct on the opposite side of said cylinder having a separate water jacket extending along said cylinder toward said crank case and having means at its crank case end connecting with said pump inlet connection, and a pair of inlet and outlet connections for said separate water jacket and said cylinder jacket, respectively, for connecting the same with the jacket of said main engine.

11. In an internal combustion engine, a cylinder block casting including a cylinder wall, a water jacket wall enveloping the latter, valve means on one side of said cylinder, exhaust duct means extending from said valve means to one side of said block, water jacket means in said block on the opposite side of said cylinder from said valve means and spaced from said cylinder jacket to define an exhaust passage extending across said block, and a pair of side castings secured to opposite sides, respectively, of said block, one of said side castings having an exhaust conduit therein connecting said exhaust duct means with one end of said exhaust passage and water jacket means around said conduit communicating with said cylinder water jacket, the other of said side castings having an exhaust continuation duct communicating with the other end of said exhaust passage.

12. The combination set forth in claim 11, including the further provision of water jacket means disposed around said exhaust continuation duct, and inlet and outlet water connections on said side castings, respectively.

13. The combination set forth in claim 11, including the further provision of water jacket means disposed around said exhaust continuation duct, and a water pump connected between the last-mentioned water jacket means and said cylinder water jacket.

14. The combination set forth in claim 11, including the further provision that said cylinder block casting is provided with an exhaust discharge duct communicating with the end of said continuation duct remote from said exhaust passage.

15. The combination set forth in claim 11, including the further provision that said cylinder block casting is provided with an exhaust discharge duct communicating with the end of said continuation duct remote from said exhaust passage, water jacket means in said other side casting disposed around said continuation duct, a water pump connected between said last-mentioned water jacket means and said cylinder water jacket, and inlet and outlet water connections on said side castings, respectively.

16. The combination set forth in claim 11, including the further provision of water jacket means disposed around said exhaust continuation duct, said water jacket means around said exhaust passage in said cylinder block being divided in two separate sections communicating with said water jacket means in said side castings, respectively, and a water pump connected between said water jacket means disposed around said exhaust continuation duct and said cylinder water jacket.

17. In an internal combustion engine comprising cylinder means and intake and exhaust valve means on one side of said cylinder means, an exhaust duct leading from said exhaust valve means and extending peripherally around said cylinder means and spaced therefrom, an intake passage leading to said intake valve means and disposed adjacent said exhaust duct in heat transferring relation thereto remotely from said exhaust valve means, and water jacket means inclosing said cylinder means and said exhaust duct between said exhaust valve means and said intake passage.

18. In an internal combustion engine comprising cylinder means and intake and exhaust valve means on one side of said cylinder means, an exhaust duct leading from said exhaust valve means and extending peripherally around said cylinder means and spaced therefrom, an intake passage leading to said intake valve means and disposed adjacent said exhaust duct in heat transferring relation thereto remotely from said exhaust valve means, water jacket means enclosing said cylinder means and said intake passage, an intake duct for leading fuel mixture to said intake valve means from one side of said cylinder means, an exhaust duct leading from said exhaust valve means and extending toward the opposite side of said cylinder means and peripherally around said cylinder means to said intake duct, said exhaust and intake ducts being adjoined in heat transferring relation at said one side of the cylinder means, and means for cooling the exhaust gases before the latter reach the portion of said exhaust duct adjoining said intake duct comprising water jacket means surrounding said cylinder means and enveloping a portion of said exhaust duct adjacent said exhaust valve means.

19. For use with a main compression ignition engine, a starting engine comprising a cylinder having a water jacket surrounding the same and intake and exhaust valve means on one side of said cylinder, an intake duct for leading fuel mixture to said intake valve means from one side of said cylinder, an exhaust duct leading from said exhaust valve means and extending toward the opposite side of said cylinder and peripherally around said cylinder in contact with said water jacket to said intake duct, a water jacket enclosing said exhaust duct and connected with said cylinder water jacket, said exhaust and intake ducts being adjoined in heat transferring relation at said one side of the cylinder near said intake valve means, and a pair of inlet and outlet connections for said water jacket adapted for connection to the main engine for warming the latter.

20. In an internal combustion engine comprising cylinder means and intake and exhaust valve means on one side of said cylinder means, an exhaust duct leading from said exhaust valve means and extending peripherally around said cylinder means and spaced therefrom, an intake passage leading to said intake valve means and disposed adjacent said exhaust duct in heat transferring relation thereto remotely from said exhaust valve means, water jacket means enclosing said cylinder means and said intake passage, an intake duct for leading fuel mixture to said intake valve means from one side of said cylinder means, an exhaust duct leading from said exhaust valve means and extending toward the opposite side of said cylinder means and peripherally around said cylinder means to said intake duct, said exhaust and intake ducts being adjoined in heat transferring relation at said one side of the cylinder means, and means for cooling the exhaust gases before the latter reach the portion of said exhaust duct adjoining said intake duct comprising water jacket means surrounding said cylinder means and enveloping a portion of said exhaust duct adjacent said exhaust valve means, a second water jacket portion enveloping a portion of said exhaust duct between the first mentioned exhaust duct jacket portion and said intake duct, and a water pump having an inlet connected to said second water jacket portion and an outlet connected with said cylinder water jacket.

21. In an internal combustion engine, a cylinder block casting including a cylinder wall, a water jacket wall enveloping the latter, inlet and exhaust valve means on one side of said cylinder, exhaust duct means extending from said exhaust valve means to one side of said block, intake duct means extending from said intake valve means to the other side of said block, water jacket means in said block on the opposite side of said cylinder from said valve means and spaced from said cylinder jacket to define an exhaust passage extending across said block, and a pair of side castings secured to opposite sides, respectively, of said block, one of said side castings having an exhaust conduit therein connecting said exhaust duct means with one end of said exhaust passage and water jacket means around said conduit communicating wtih said cylinder water jacket, the other of said side castings having an exhaust continuation duct communicating with the other end of said exhaust passage and extending toward said intake duct means, an intake passage in said other side casting adjoining said exhaust continuation duct, water jacket means enveloping the latter, and a pair of inlet and outlet water connections on said side castings, respectively.

22. The combination set forth in claim 21, including the further provision of a water pump connected between the water jackets on said exhaust continuation duct and said cylinder, respectively.

WAYNE H. WORTHINGTON.

REFERENCES CITED

The following references are of record in the file of this patent:

UNITED STATES PATENTS

| Number | Name | Date |
| --- | --- | --- |
| 904,562 | Rathbun | Nov. 24, 1908 |
| 1,164,675 | Sturtevant | Dec. 21, 1915 |
| 2,155,776 | Starr | Apr. 25, 1939 |